United States Patent

Hamura et al.

[11] Patent Number: 5,192,382
[45] Date of Patent: Mar. 9, 1993

[54] METHOD OF MANUFACTURING LOW-EDGE V-BELTS

[75] Inventors: Takeshi Hamura, Aichi; Hideaki Tanaka, Hyogo, both of Japan

[73] Assignee: Mitsuboshi Belting Ltd., Hyogo, Japan

[21] Appl. No.: 536,544

[22] PCT Filed: Mar. 28, 1990

[86] PCT No.: PCT/JP90/00417

§ 371 Date: Jul. 6, 1991

§ 102(e) Date: Jul. 6, 1991

[87] PCT Pub. No.: WO91/14567

PCT Pub. Date: Oct. 3, 1991

[51] Int. Cl.$^5$ ............... B29C 53/56; B29C 59/00; B29C 67/00

[52] U.S. Cl. .................. 156/137; 156/139; 156/140; 156/142; 264/157; 264/162; 264/258; 264/292

[58] Field of Search .............. 156/142, 139, 140, 141, 156/142, 153, 154; 264/157, 258, 162, 297.5; 51/2, 37 R

[56] References Cited

U.S. PATENT DOCUMENTS

| | | | |
|---|---|---|---|
| 1,401,480 | 12/1921 | King | 156/139 |
| 1,432,973 | 10/1922 | Delzell | 156/142 |
| 2,354,062 | 7/1944 | Ritzert | 156/142 |
| 2,773,540 | 12/1956 | Waugh | 156/142 |
| 2,991,498 | 7/1961 | Rockoff et al. | 156/137 |
| 3,592,709 | 7/1971 | Marzocchi et al. | 156/142 |
| 3,891,405 | 6/1975 | Huber | 264/162 |
| 3,987,684 | 10/1976 | Fisher et al. | 156/142 |
| 4,231,826 | 11/1980 | Wrast et al. | 156/142 |
| 4,368,656 | 1/1983 | Howenton et al. | 156/142 |
| 4,782,575 | 11/1988 | Kamiyama | 156/142 |
| 4,931,118 | 6/1990 | Kitahama et al. | 156/139 |

FOREIGN PATENT DOCUMENTS

| | | | |
|---|---|---|---|
| 0557914 | 5/1958 | Canada | 156/142 |
| 1268825 | 5/1968 | Fed. Rep. of Germany | 156/142 |
| 2358964 | 6/1974 | Fed. Rep. of Germany | 156/142 |

Primary Examiner—Willard Hoag
Attorney, Agent, or Firm—Sughrue, Mion, Zinn, Macpeak & Seas

[57] ABSTRACT

The present invention relates to a method of manufacturing low-edge V-belts including the steps of: forming an unvulcanized belt annular body inside out by winding respective components constituting the elongated portion, tension-resistant portion, and compressed portion of the belt in laminated form on the circumferential surface of a forming drum; vulcanizing the unvulcanized belt annular body to obtain a vulcanized annular body; revolving the vulcanized annular body by winding on a pair consisting of a drive drum and an idle drum thereby to grind V-shaped grooves on the surface of the vulcanized annular body with a grinding wheel which is a group of grindstones whose cross-section is V-shaped being in pressure contact with the drive or idle drum; causing projections arranged on a positioning member which is capable of gradually increasing the depth of engagement to engage with the V-shaped grooves; and cutting the vulcanized annular body thus processed thereafter. Accordingly, the method ensures to cut even a long belt accurately and contributes to increasing the working efficiency.

5 Claims, 3 Drawing Sheets

METHOD OF MANUFACTURING LOW-EDGE V-BELTS

FIELD OF THE INVENTION

The present invention relates to a method of manufacturing low-edge V-belts, and more particularly to a simple method of manufacturing low-edge V-belts by grinding a plurality of portions simultaneously over a 100-inches-or-more long, flat-belt-shaped vulcanized annular body installed on two drums and cutting such ground portions.

BACKGROUND ART

Conventionally, there are two types of methods for manufacturing low-edge V-belts. One is an angle-cut method and the other is a method in which a vulcanized annular body is cut in square and then ground in V form (SCAM). The former method comprises the steps of: (1) forming a laminated body of belt on an iron cylindrical drum; (2) vulcanizing the belt forming body; (3) cooling the belt forming body; (4) removing the vulcanized and sleeve-like belt forming body from the drum; (5) storing the removed belt forming body; (6) transferring the belt forming body to an expander drum and providing V-form cutting to individual V-belts; (7) siding to grind the side surfaces of each V-belt by winding the V-belt on a pair of pulleys for reducing the eccentricity of the V-belt; (8) inspecting the sided V-belt; and (9) deburring the inspected V-belt.

The latter, alternative method involves the steps of cutting the annular body in square to a predetermined width, turning each belt inside out, and then grinding the side surfaces in V form.

However, the above-described methods are only satisfactorily applicable to manufacturing belts whose size is relatively short (less than 100 inches) and thus present problems when applied to manufacturing relatively long belts (100 inches or more). In the former method it is difficult to make the vulcanized annular body for large width belts perfectly circular because it involves the use of an expander to which the vulcanized annular body must be transferred. Thus, when providing V-form cutting to the vulcanized annular body, the upper width and angles of the belt becomes erratic, thereby requiring an additional step of siding, or grinding the side surfaces of the V-belt. This causes inconveniences of not only producing much scrap but also complicating the manufacturing process.

Although variations in the width and angles of the V-belt are not as noticeable as with the first described method, the process of grinding the V-shaped grooves on a single belt basis by the latter method impairs productivity and may even result in increasing the manufacturing cost. Disclosure of the Invention The object of the present invention is to provide a method of manufacturing low-edge V-belts, a method which ensures high accuracy in cutting and satisfactory working efficiency by grinding a plurality of V-shaped portions simultaneously on a relatively long, flat-belt-shaped vulcanized annular body wound on two drums, and subsequently cutting the ground V-form portions.

To achieve the above object, present invention includes the steps of forming an unvulcanized belt annular body inside out by winding respective components constituting the elongated portion, tension-resistant portion, and compressed portion of the belt in laminated form on the peripheral surface of a forming drum; vulcanizing the unvulcanized belt annular body to obtain a vulcanized annular body; revolving the vulcanized annular body by winding on a pair of drums including a drive drum and a driven drum to thereby grind V-shaped grooves on the surface of the vulcanized annular body. The grinding wheel has a group of grindstones whose cross-section is V-shaped arranged in pressure contact with the drive or driven drum; causing projections arranged on a positioning member which is capable of gradually increasing the depth of their engagement to engage with the V-shaped grooves; and cutting off the ground V-shaped grooves thereafter.

A DETAILED DESCRIPTION OF THE PREFERRED EMBODIMENT

A specific embodiment of the present invention will now be described with reference to the accompanying drawings.

Figure 5:
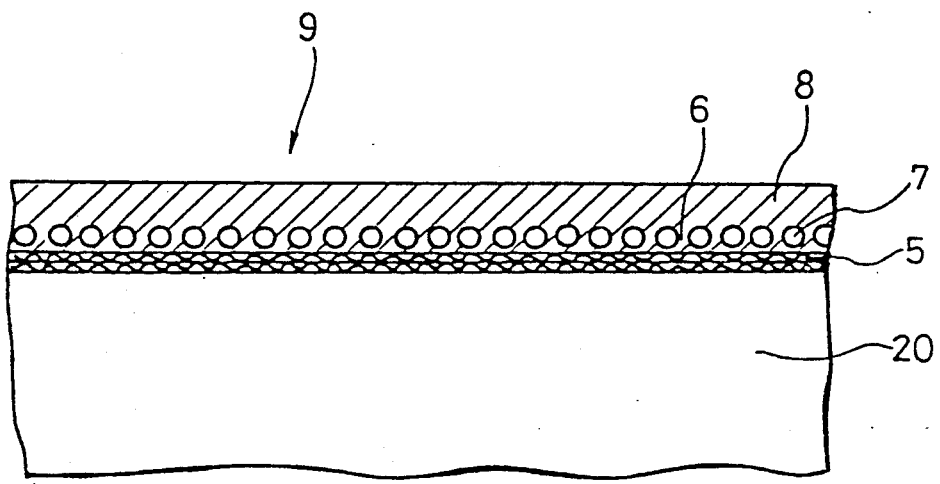
FIG. 5 is a partial longitudinal sectional view showing the manufacturing process of a vulcanizing annular body.

FIG. 5 is a partial longitudinal sectional view showing the manufacturing process of a vulcanized annular body for use in the present invention. An elastic canvass (5) such as a biased canvass high in elasticity having a warp intersecting a weft at an angle of 90° to 155° is wound by one or more plies around a cylindrical formed drum (20) in the circumferential direction, i.e., in the longitudinal direction of a belt to be manufactured. Then, after winding thereon an upper rubber layer (6), a low-elongation, high-strength tension-resistant rope (7) made of such a material as nylon, polyester, aromatic polyamide, or FIBERGLASS is wound spirally under a predetermined tension, and a lower rubber layer (8) that is thicker than the upper rubber layer (6) is laminated thereon thereby to form an unvulcanized belt annular body (9) inside out.

The lower rubber layer (8) may be arranged by filling, as necessary, various short fibers aligned in the width direction of the belt.

Figure 1:
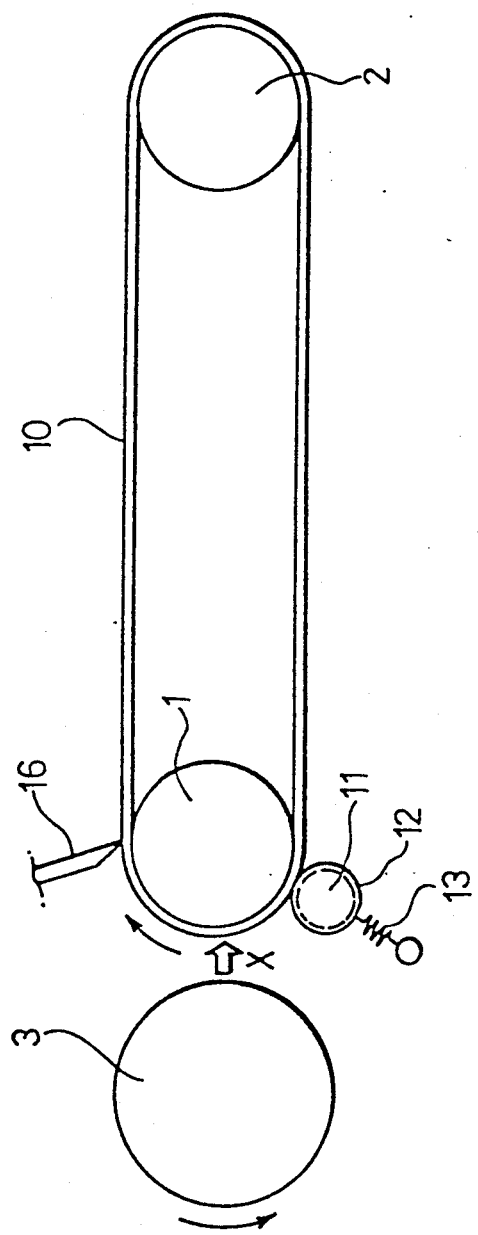
FIG. 1 is a schematic front view of a manufacturing apparatus having a grinding means for use in a manufacturing method according to the present invention.

The unvulcanized belt annular body (9) is subjected to the following vulcanization process by a well-known pressure and heating means to obtain a wide, flat-belt type vulcanized annular body (10). This vulcanized annular body (10) is then taken out from a forming drum (20) and subjected to a grinding process. FIG. 1 is a schematic front view of a manufacturing apparatus having a grinding means for forming a low-edge V-belt. The vulcanized annular body (10) is installed between a pair of drums including a drive drum (1) and a driven drum (2). On the front surface of the vulcanized annular body (the side of the lower rubber layer (8), or more specifically, on either one of the drive drum (1) or the driven drum (2) is a grinding wheel (3) and a positioning roller (11), the positioning roller (11) being located adjacent to the grinding wheel (3).

Figure 2:
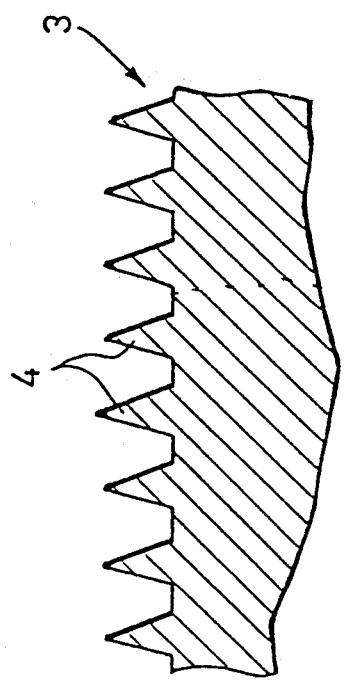
FIG. 2 is a partial sectional view of a grinding wheel; a perspective view of a low-edge V-belt manufactured by the manufacturing method according to the present invention.

The surface of the drive drum (1) or the driven drum (2) located on the side where the grinding wheel (3) is disposed is coated with a disposable protection member (not shown). This grinding wheel (3) is a long cylindrical body as shown in FIG. 2 and is provided with a plurality of grindstones (4) whose cross-section is V-shaped around its circumference. This grindstone-equipped grinding wheel (3) is automatically rotated in a direction reverse, or in some case, identical to that of the drive drum (1), and is gradually movable in the radial direction as shown by the arrow (X).

On the other hand, the positioning roller (11) is arranged close to and immediately in front of the grinding wheel (3). More specifically, as shown in FIG. 1, when the grinding wheel (3) is arranged on the driven drum (1) so as to be in contact therewith, the positioning roller (11) also contacts the drive drum (1). Thus, the positioning roller (11) is pivotaby supported on the drive drum (1), thereby efficiently performing its intended function. The positioning roller (11) has a long cylindrical shape similar to that of the grinding wheel (3) and has on its cylindrical circumferential surface a group of projections (12) each of which is identical in pitch and shape to each of the V-shaped grindstones arranged on the grinding wheel (3). The positioning roller (11) is also constructed so as to be pressed on the vulcanized annular body (10) by a well-known pressure means (13) such as a spring at the time the vulcanized annular body (10) is ground by the grinding wheel (3). Each of the projections (12) of the positioning roller (11) is made of either rubber, a synthetic resin, or a metal.

In the apparatus thus constructed, the vulcanized annular body (10) is revolved by rotating the drive drum (1). Under this condition, the grinding wheel (3) is gradually pressed against the surface of the vulcanized annular body (10) and may be rotated in the direction reverse to that of the drive drum (1). Accordingly, V-shaped grooves (14) are formed on the surface of the vulcanized annular body around its circumference by the V-shaped grindstones (4) of the grinding wheel (3), thereby forming a plurality of circumferentially extended compressed portions (8) on the surface of the vulcanized annular body. With the depth of the grooves being increased as the V-shaped groove forming process by the grinding wheel (3) progresses, the V-shaped projections (12) arranged on the positioning roller (11) which has been pressed on the surface of the vulcanized annular body in advance of the grinding wheel (3), are engaged with the V-shaped grooves of the vulcanized annular body (10), thereby stopping the movement of the vulcanized annular body (10) immediately before the grinding wheel (3) to thereby enhance the accuracy in grinding the V-shaped grooves (see FIG. 3).

Figure 3:
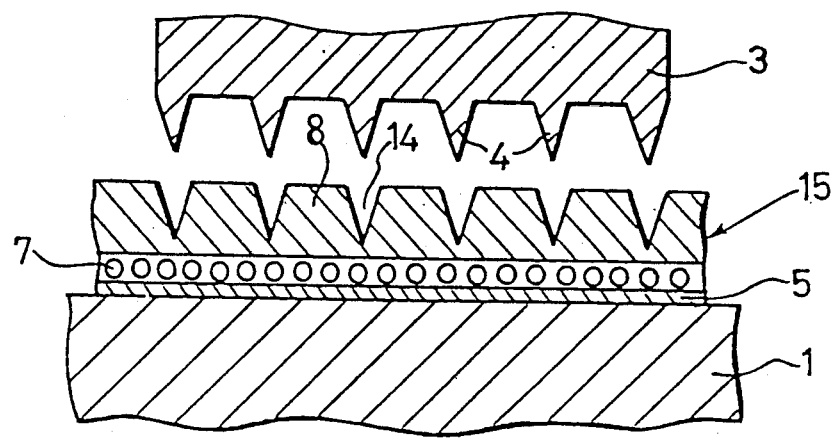
Figure 4:
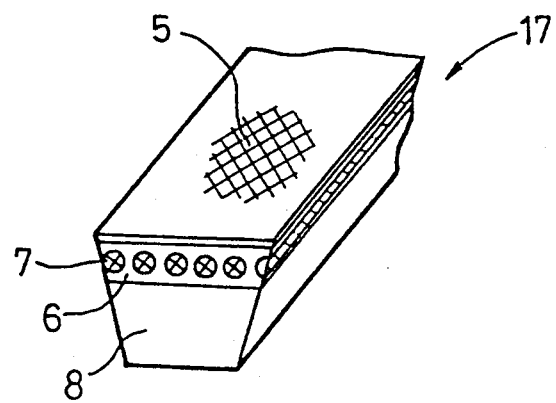

Thus, as shown in FIG. 3, a combined belt (15) having a plurality of low-edge V-belts combined together is obtained. This combined belt is then cut either simultaneously by a multi-blade cutter (16) whose blades are so arranged as to correspond to the groove pitch of a V-belt from the side of the V-shaped groove or sequentially by a single-blade cutter while moving the single-blade cutter along the length of the combined belt. Thus, a plurality of low-edge V-belts (17) are produced, each of which incorporates the tension-resistant body (7) in the adhesive rubber (6) below which the compressed rubber portion (8) extends, and on which canvass with rubber portion (5) extends as shown in FIG. 4.

Thus, according to the present invention, a vulcanized annular body, having been formed inside out and then vulcanized, is wound on two drums and revolved to grind grooves in V form on predetermined locations of the vulcanized annular body by a grinding wheel having a group of grindstones each having a V-shaped cross-section. The annular body is then cut. The resulting annular body is not subject to angle deviations as observed in the conventional angle-cut system, the cutting accuracy is improved, and the grinding efficiency is also improved compared to the conventional SCAM system. Furthermore, it is possible to grind and cut a long size annular body with high accuracy by simply changing the distance between the drums.

What is claimed is:

1. A method of manufacturing low-edge V-belts comprising the steps of:
   forming an unvulcanized belt from an inside portion to an outside portion by winding respective components comprising an elongated portion, a tension-resistant portion, and a compressed portion, in laminated form, on a circumferential surface of a forming drum;
   vulcanizing said unvulcanized belt to obtain a vulcanized belt;
   removing said vulcanized belt from said forming drum;
   rotating said vulcanized belt on drums comprising a drive drum and a driven drum;
   grinding multiple, V-shaped grooves on a surface of said vulcanized belt using a grinding wheel having a group of adjacent grindstones, each of said grindstones exhibiting a V-shaped cross-section, said grinding wheel being in pressure contact with said vulcanized belt on one of said drive and driven drum;
   causing projections arranged on a positioning member, said positioning member gradually increasing a depth of engagement, to engage with said V-shaped grooves;
   and cutting said vulcanized annular body thus processed.

2. A method according to claim 1, wherein said one of said drive drum and said driven drum, in pressure contact with said vulcanized belt and said grinding wheel, is coated with a disposable protection member prior to said rotating step.

3. A method according to claim 1, wherein said positioning member is a roller, pivotably supported on said drive drum, said roller being pivotally moved into contact with said vulcanized belt before said grinding step.

4. A method according to claim 3, wherein said positioning member is pressed against said vulcanized belt, by a spring force, in advance of said grinding wheel, to thereby align and fix said vulcanized belt prior to said grinding step.

5. A method according to claim 1, wherein said grinding step forms only one of said V-shaped grooves.

* * * * *